(12) United States Patent
Wilde et al.

(10) Patent No.: US 10,752,551 B2
(45) Date of Patent: Aug. 25, 2020

(54) CONSTRUCTION CHEMICAL FORMULATION

(71) Applicant: UZIN UTZ AG, Ulm (DE)

(72) Inventors: Markus Wilde, Vohringen-Illerzell (DE); Sven Schiller, Ichenhausen (DE); Markus Gretz, Gunzburg (DE); Robert Hamberger, Ulm (DE); Johannis Tsalos, Ulm (DE)

(73) Assignee: UZIN UTZ AG, Ulm (DE)

( * ) Notice: Subject to any disclaimer, the term of this patent is extended or adjusted under 35 U.S.C. 154(b) by 0 days.

(21) Appl. No.: 15/556,406

(22) PCT Filed: Mar. 8, 2016

(86) PCT No.: PCT/EP2016/054875
§ 371 (c)(1),
(2) Date: Sep. 7, 2017

(87) PCT Pub. No.: WO2016/142365
PCT Pub. Date: Sep. 15, 2016

(65) Prior Publication Data
US 2018/0105466 A1 Apr. 19, 2018

(30) Foreign Application Priority Data

Mar. 9, 2015 (EP) .................................... 15158268

(51) Int. Cl.
*C04B 14/06* (2006.01)
*C04B 28/14* (2006.01)
(Continued)

(52) U.S. Cl.
CPC ............ *C04B 28/146* (2013.01); *C04B 28/14* (2013.01); *C04B 28/145* (2013.01);
(Continued)

(58) Field of Classification Search
CPC ... C04B 28/146; C04B 28/147; C04B 28/148; C04B 28/14; C04B 14/28; C04B 14/06; C04B 2103/10; C04B 28/16; C04B 28/145
(Continued)

(56) References Cited

U.S. PATENT DOCUMENTS

| | | | | |
|---|---|---|---|---|
| 2008/0098933 A1* | 5/2008 | Killat | ...................... | C04B 24/32 |
| | | | | 106/638 |
| 2008/0141907 A1* | 6/2008 | Campbell | ............... | C04B 28/14 |
| | | | | 106/695 |

(Continued)

FOREIGN PATENT DOCUMENTS

| | | |
|---|---|---|
| WO | 2014/108435 A1 | 7/2014 |
| WO | 2014/108436 A1 | 7/2014 |

OTHER PUBLICATIONS

International Search Report dated May 10, 2016 issued in corresponding PCT/EP2016/054875 application (2 pages).

*Primary Examiner* — Hannah J Pak

(74) *Attorney, Agent, or Firm* — Millen White Zelano and Branigan, PC; Csaba Henter

(57) ABSTRACT

The present invention relates to a quick and low-stress setting chemical formulation for construction, containing at least one binding agent on the basis of calcium sulfate, at least an ettringite-forming agent, at least one activator, at least one filler, at least one redispersable dispersion powder and optionally additives and to the use of the chemical formulation for construction for producing thin-layered balancing masses, self running and solid fillers, screed binding agents or screed mortars, tile adhesive mortars, jointing mortars and sealing sludges.

18 Claims, 4 Drawing Sheets

Figure 1:
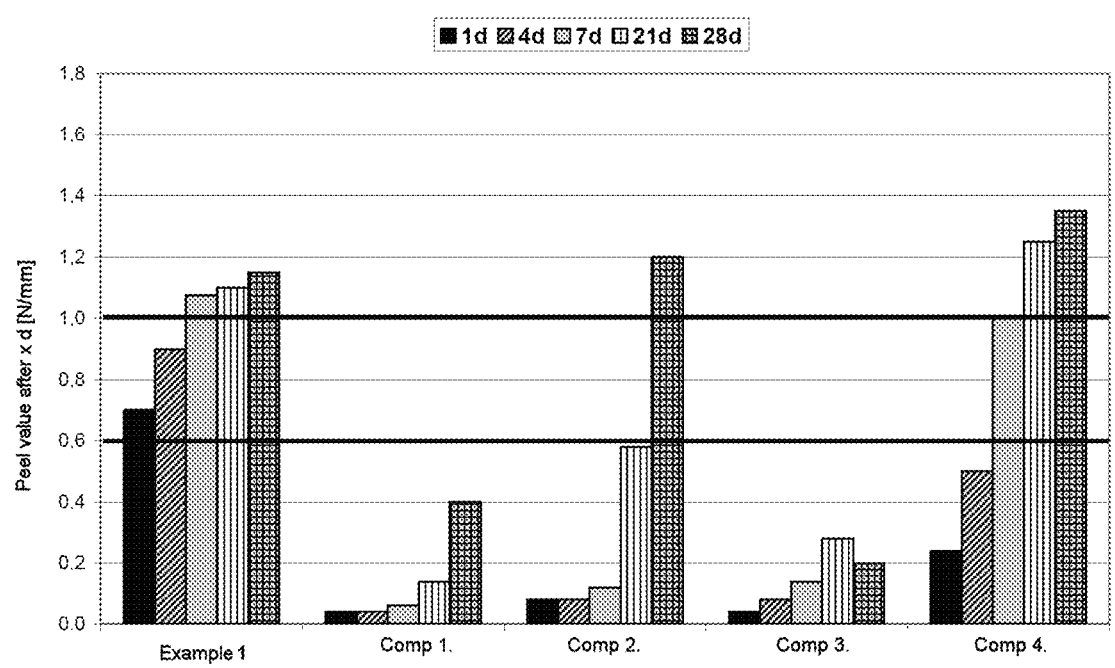

(51) Int. Cl.
  *C04B 28/16*   (2006.01)
  *C04B 111/00*  (2006.01)
  *C04B 111/60*  (2006.01)

(52) U.S. Cl.
  CPC ............ C04B 28/147 (2013.01); C04B 28/16 (2013.01); *C04B 2111/00517* (2013.01); *C04B 2111/00663* (2013.01); *C04B 2111/60* (2013.01)

(58) Field of Classification Search
  USPC .......................................................... 524/5
  See application file for complete search history.

(56)           References Cited

U.S. PATENT DOCUMENTS

2011/0259245 A1*  10/2011  Sperisen .............. C04B 28/006
                                                  106/624
2013/0133554 A1*   5/2013  Lloyd ................. C04B 28/065
                                                  106/695

* cited by examiner

CONSTRUCTION CHEMICAL FORMULATION

The present invention relates to a construction chemical formulation, containing a binder based on calcium sulfate, an ettringite former, an activator, and a filler, and to the use of the construction chemical formulation for preparing thin-layer levelling compounds, self-levelling and stable smoothing compounds, screed binders or screed mortars, tile adhesive mortars, grouts and sealing slurries.

Laying floor coverings, such as PVC or rubber coverings, places particular requirements on the subfloor. In order to level out unevenness in a floor or unfinished floor, levelling/smoothing compounds or screeds are used. These ensure, inter alia, that the subfloor is levelled and is uniformly absorbent. This absorbency is highly important in particular for the subsequent adhesive bonding of floor coverings using aqueous adhesive systems (e.g. dispersion adhesives). The functional, defect-free adhesive bonding of floor coverings on levelling/smoothing compounds can be checked by determining peel values. In general, peel values of greater than 0.6 N/mm after 24 hours are required for functional adhesive bonding. These values should also increase continuously and preferably reach at least 1 N/mm (after approximately 4-7 days). In addition, functional, defect-free adhesive bonding is shown on account of a durable bond of the floor covering to the subfloor (the covering not becoming detached) and a uniform surface appearance (no bubbles forming in the covering).

If construction is due to progress quickly, cementitious smoothing/levelling compounds which make it possible, if necessary, to apply a covering as early as after one hour are often used.

Cementitious systems of this kind contain various cements and special cements in order to chemically bind surplus mixing water. Since cement hydration is accompanied by a change in volume, systems of this kind harden under high tension in some cases. Therefore, cementitious systems can only be used to a limited extent on unstable subfloors. As a result of the brittleness of the hardened compound, the risk arises that cracks will form and the levelling/smoothing compound will detach from the subfloor.

Cement-based smoothing compounds or screed compositions of this kind that have the above-mentioned drawbacks are described in the publications given below.

US 2008/0141907 A1 discloses screeds comprising sand made of recycled glass waste, calcium sulfoaluminate cement, limestone powder, Portland cement, calcium sulfate hemi-hydrate and other additives, e.g. accelerators or retarders.

US 2012/0037046 A1 describes a screed composition comprising, inter alia, a cementitious binder made of calcium sulfoaluminate cement, Portland cement and calcium sulfate.

WO 2008/003672 A1 relates to smoothing compounds containing, as essential constituents, Portland cement, fillers or pigments and a binder component. In this case, a distinction is made between two embodiments, specifically cement-based smoothing compounds having cement as the main binder in the first case. The cement-based smoothing compounds contain, as the binder component, a mixture of aluminate cement (from 20 to 40 wt. %, based on the total smoothing compound) and a source of reactive sulfates (e.g. calcium sulfate) in an amount of from 2 to 15 wt. %, based on the total smoothing compound. In the second case, WO 2008/003672 A1 describes gypsum-based smoothing compounds that contain, as the binder component, a source of reactive sulfates but no aluminate cement. Smoothing compounds containing binders based on calcium sulfate as the main binder component and also aluminate cement are therefore not disclosed in WO 2008/003672 A1.

WO 2014/108436 describes a binder composition that comprises calcium sulfate, Portland cement, calcium aluminate cement, zeolite and/or metakaolin, the calcium sulfate being contained in an amount of 50 parts by weight, based on the total amount of components (a) to (d). The binder composition is water-resistant once set and produces a waterproof construction material. WO 2014/108435 also describes a water-resistant binder composition comprising anhydrite, Portland cement, calcium aluminate cement, zeolite and/or metakaolin, and a sulfate salt. WO 2015/150319 describes a gypsum composition containing a mixture of calcium aluminate and calcium sulfate hemihydrate, anhydrite or calcium sulfate dihydrate in a weight ratio of from 1:1 to 1:5 and fillers.

Binder systems based on calcium sulfate having a binder based on calcium sulfate as the main binder component have several advantages over cementitious binder systems. As a result of the hydration products formed, smoothing/levelling compounds of this kind generally harden in a more dimensionally stable manner than cementitious products. Products based on calcium sulfate also have a lower tendency to crack, and therefore the use on unstable subfloors, old subfloors or renovation subfloors (e.g. mastic asphalt, old adhesive) is made possible.

Furthermore, a drawback to the construction products known from the prior art that contain calcium sulfate and contain binders based on calcium sulfate as the main binder component is that they are slow to dry. This considerably increases the time to reach readiness for covering and slows down construction progress. The reason for the longer drying time of known construction products that are based on calcium sulfate and have binder systems based on calcium sulfate is the hydration process. Whereas water is chemically bound in the hydration phases in the hydration products of cementitious binders/binder systems, the hydration products are precipitated from a supersaturated solution when calcium sulfate binders are hydrated. In systems based on calcium sulfate, the surplus mixing water mostly has to be discharged to the environment. Therefore, the prior art does not disclose levelling and smoothing compounds based on calcium sulfate that ensure readiness for covering in a time of less than 12-24 hours. In this case, the time for a subfloor to reach readiness for covering corresponds to the period between application of the levelling/smoothing compound and the time from which functional adhesive bonding of floor coverings is possible. In general, peel values of greater than 0.6 N/mm after 24 hours are required for functional adhesive bonding. These values should also increase continuously and preferably be at least 1 N/mm (after approximately 4-7 days). When readiness for covering has been reached, there is sufficiently little residual moisture, and water that has been introduced by applying the adhesive can be compensated for, and therefore defect-free adhesive bonding is made possible. Adhesive bonding is defect-free if no bubbles form in the floor covering and said floor covering durably bonds to the subfloor without becoming detached.

In summary, the drawbacks to construction chemical formulations from the prior art can thus be described as follows: although cementitious systems result in fast hardening, this does not take place in a tension-free manner. The consequences are brittleness and the risk of cracks forming.

Systems based purely on calcium sulfate harden too slowly to provide the required readiness for covering in a timely manner for fast construction progress.

The object of the invention is therefore that of providing formulations for construction products that dry quickly and reach readiness for covering in a timely manner (in particular as early as after fewer than six hours). The formulations are thus intended to make fast construction progress possible. The object of the invention is also that of providing formulations for preparing levelling compounds, self-levelling and stable smoothing compounds, screed binders or screed mortars and tile adhesive mortars, grouts and sealing slurries that have the above-mentioned properties.

The present object is achieved by a construction chemical formulation, comprising
a) from 20 to 80 wt. % of at least one binder based on calcium sulfate;
b) from 1 to 15 wt. % of at least one ettringite former;
c) from 0.01 to 5 wt. % of at least one activator; and
d) from 8 to 60 wt. % of at least one filler;
e) from 0.1 to 10 wt. % of at least one redispersible dispersion powder
in each case based on the total weight of the formulation, the amounts adding up to 100 wt. %.

According to one embodiment, the formulation contains substantially no metakaolin and/or substantially no zeolite (aluminosilicate, in particular of the composition $M^{n+}_{x/n}[(AlO_2)^-_x(SiO_2)]_y \cdot z\, H_2O$, where M is a cation of an alkali metal or alkaline earth metal, $NH_4^+$ and/or $H^+$, n represents 1 or 2, and x and y represent a number from 1 to 200). Here the term "substantially" means less than 2 wt. %, in particular less than 1 wt. % or less than 0.5 wt. % and in particular 0 wt. %, of metakaolin or zeolite or a mixture thereof.

In a preferred embodiment of the construction chemical formulation according to the invention, the binder is selected from calcium sulfate hemihydrate (calcium sulfate α-hemihydrate and/or calcium sulfate β-hemihydrate), calcium sulfate anhydrite, calcium sulfate dihydrate and mixtures of two or more thereof). The binder is preferably calcium sulfate hemihydrate. The binder is contained in the construction chemical formulation according to the invention in an amount of from 20 to 80 wt. %, based on the total weight of the formulation; a content of from 35 to 60 wt. % is particularly preferred, and a content of from 40 to 55 wt. %, in particular from 41 to 55 wt. %, is very particularly preferred.

A further constituent of the formulation according to the invention is at least one ettringite former. The ettringite former is contained in the formulation in an amount of from 1 to 15 wt. %, based on the total weight of the formulation. A content of ettringite former of from 3 to 10 wt. %, in particular from 3 to 8 wt. %, is preferred. The ettringite former is preferably selected from calcium sulfoaluminate cement (CSA cement), sodium aluminate, high-alumina cement, aluminium sulfate and mixtures thereof. The use of calcium sulfoaluminate cement, high-alumina cement or mixtures thereof as the ettringite former is particularly preferred.

A high-alumina cement of the chemical composition 35-71 wt. % $Al_2O_3$, 27-40 wt. % CaO, 0.5-5 wt. % $SiO_2$ and 0.1-20 wt.-% $Fe_2O_3$ or CSA cement of the chemical composition 27-31 wt. % $Al_2O_3$, 36-41 wt. % CaO, 2-7 wt. % $SiO_2$, 1.5 wt. % $Fe_2O_3$, 12-16 wt. % $SO_3$ and 5 wt. % MgO is preferred.

Ettringite is a mineral from the class of minerals of the hydrous sulfates having foreign anions. It crystallises with the chemical composition $Ca_6Al_2[(OH)_{12}|(SO_4)_3] \cdot 26\, H_2O$ and generally produces well-defined prismatic or acicular crystals. According to typical construction chemical notation, the oxidic empirical formula is as follows: $3CaO \cdot Al_2O_3 \cdot 3CaSO_4 \cdot 32H_2O$. In the context of this invention, the formation of ettringite is understood to mean the formation of ettringite from constituents a) and b) of the formulation according to the invention. The formation of ettringite from said components a) and b) presents an advantageous possibility for binding water.

The amount of calcium sulfate binder and ettringite former in the total formulation is preferably from 40 to 60 wt. %.

By adding an ettringite former to the formulation according to the invention, it is possible, by means of the above-mentioned binding of water, to ensure quick drying and setting of the applied levelling compounds, self-levelling and stable smoothing compounds, screed binders or screed mortars and tile adhesive mortar, grouts and sealing slurries. The formulations according to the invention allow a quick readiness for covering of less than six hours.

The construction chemical formulation according to the invention contains at least one activator, which is preferably selected from Portland cement, calcium hydroxide, sodium hydroxide, potassium hydroxide, alkali water glasses and mixtures thereof. Portland cement or calcium hydroxide or mixtures thereof are particularly preferred.

The activator(s) is/are added in order to control, preferably increase, the pH of the construction chemical formulation. For example, an amount of activator that is sufficient to set a pH of from 9 to 14 is added to the construction chemical formulation. It is particularly preferred for it to be possible to set a pH of from 11 to 14 by adding the activator. Setting the pH to a value of from 9 to 14, in particular 10 to 14, by adding the activator has the effect that ettringite forms in the construction chemical formulation when the pH is in the specified range. Advantageously, ettringite does not therefore form spontaneously, but rather in a manner controlled by adding the activator.

The activator is contained in the construction chemical formulation in an amount of from 0.01 to 5 wt. %, based on the total weight of the formulation. The activator is preferably contained in the formulation in an amount of from 0.1 to 2 wt. %, based on the total weight of the formulation.

In addition to components a) to c), fillers are contained in the formulation according to the invention in an amount of from 8 to 60 wt. %, based on the total weight of the formulation. The amount of fillers is preferably from 30 to 60 wt. %, in particular from 35 to 55 wt. %, based on the total weight of the formulation. Examples of fillers are silica sands, limestone and limestone powders, dolomite, talc, mica, and light fillers such as expanded glass granulates or expanded clays. Furthermore, latent hydraulic constituents such as pozzolans, fly ashes or blast furnace slag are also suitable. The average particle size of the filler is preferably from 0.001 to 10 mm, in particular from 0.005 to 8 mm. Preferred fillers are sand or limestone powder and mixtures thereof.

In addition to components a) to d), redispersible dispersion powders are contained in the formulation according to the invention in an amount of from 0.1 to 10 wt. %, based on the total weight of the formulation. The amount of redispersible dispersion powder is preferably from 0.5 to 10 wt. %, in particular from 1.0 to 10 wt. %, based on the total weight of the formulation.

Redispersible dispersion powders can be polymers or copolymers based on vinyl aromatics, such as styrene, vinyl esters of $C_1$-$C_{15}$ alkyl carboxylic acids, dienes, esters of (meth)acrylic acid with $C_1$-$C_{12}$ alkanols, vinyl halides and/or olefins. Vinyl esters of $C_1$-$C_{15}$ alkyl carboxylic acids, copolymers of vinyl esters of $C_1$-$C_{15}$ alkyl carboxylic acids with olefins, or copolymers of esters of (meth)acrylic acid with $C_1$-$C_{12}$ alkanols with styrene are preferred. Ethylene-vinyl acetate copolymers, ethylene-vinyl versatate copolymers or styrene acrylates are given as examples.

Preferably, a polymer or copolymer having a minimum film-forming temperature (MFFT) in the range of from approximately −5° C. to approximately +10° C. is used as the redispersible dispersion powder.

In a preferred embodiment, the construction chemical formulation additionally comprises at least one additive in an amount of from 0.01 to 7 wt. %, preferably from 0.1 to 5 wt. %, based on the total weight of the formulation. Preferably, the additive is selected from liquefiers, setting retarders, setting accelerators, thickeners, stabilisers, plastic fibres, anti-foaming agents, air-entraining agents, dispersants/wetting agents, hydrophobing agents and mixtures thereof.

Liquefiers are, for example, casein, melamine formaldehyde condensates or comb polymers based on poly(meth)acrylic acid having polyethylene oxide side chains (PCEs, polycarboxylate ethers). Examples of thickeners are mineral phyllosilicates such as bentonite or talc. Stabilisers may be organic stabilisers, for example polysaccharides such as a starch ethers, guar gum, xanthan gum and cellulose ethers and modified cellulose ethers, for example methyl cellulose, ethyl cellulose, propyl cellulose and methyl ethyl cellulose, hydroxyalkyl celluloses such as hydroxyethyl cellulose (HEC), hydroxypropylcellulose (HPC) and hydroxyethyl hydroxypropyl cellulose, alkyl hydroxyalkyl celluloses such as methyl hydroxyethyl cellulose (MHEC), methyl hydroxypropyl cellulose (MHPC) and propyl hydroxypropyl cellulose, or polycarboxylic acids such as polyacrylic acid and polyvinyl alcohols. Setting retarders are, for example, fruit acids (tartaric acid or citric acid), phosphates, polyphosphates, alkali gluconates, saccharides or alkali tartrates. Suitable setting accelerators are, for example, alkali carbonates, sodium sulfate, potassium sulfate or calcium sulfate dihydrate. Examples of plastic fibres are polyolefin fibres having a length of from 0.1 to 1 mm, in particular polypropylene fibres. Further examples thereof are polyacrylonitrile fibres. Examples of anti-foaming agents are modified siloxanes on inorganic substrates. Hydrophobing additives are, for example, salts of long-chain fatty acids or organosilicon compounds.

The construction chemical formulations according to the invention (powder formulation) are produced by successively mixing the constituents in any desired order or by simultaneously mixing in a mixing device typical for these purposes.

The invention also relates to the use of the construction chemical formulation according to the invention for preparing thin-layer levelling compounds (for example, having a layer thickness of from 0.5 to 5 mm), self-levelling and stable smoothing compounds, screed binders or screed mortars, and, as tile adhesive mortars, grouts or sealing slurries.

When the construction chemical formulation according to the invention is used, the following advantages are intended to be achieved: quick drying of the compounds by means of ettringite formation, during which the free water of a composition (especially the mixing water) is bound in ettringite as water of crystallisation. By controlling the formation of ettringite using an activator, the construction products can be set at a defined point in time.

Construction products based on the construction chemical formulation according to the invention harden under low tension, and readiness for covering is reached within less than six hours.

The following drawings and examples will be used to explain and illustrate the invention.

FIG. 1 shows peels values after 1, 4, 7, 21 and 28 days when PVC is adhesively bonded to various smoothing compounds (example 1 and comparative examples Comp. 1 to Comp. 4) four hours after application.

Figure 2:
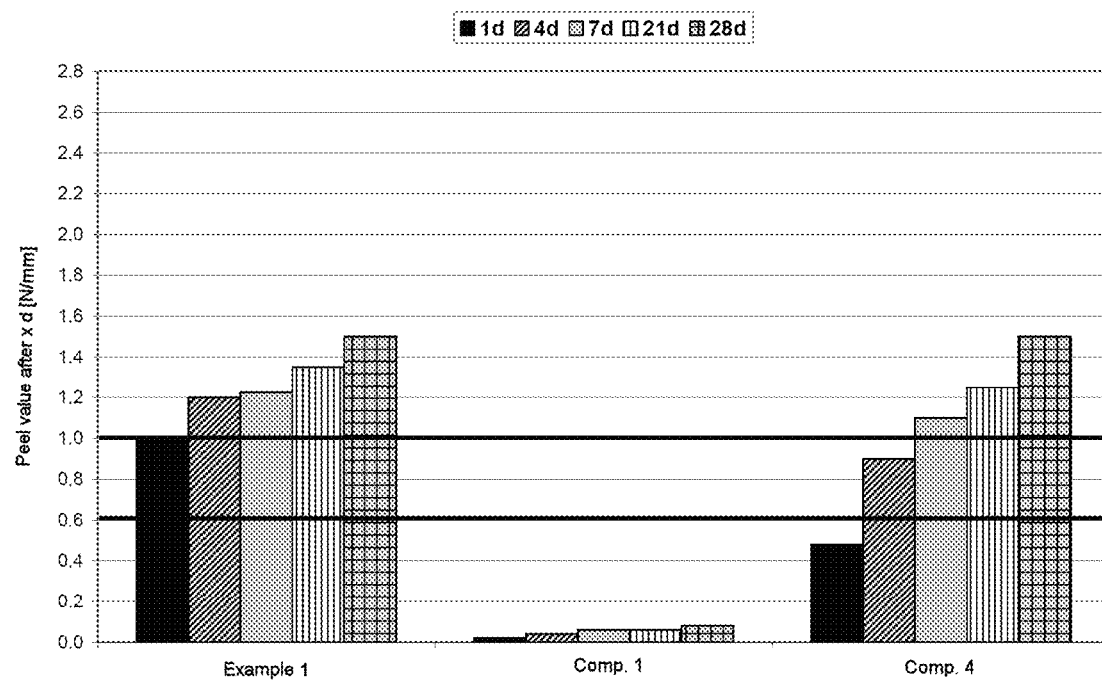

FIG. 2 shows peels values after 1, 4, 7, 21 and 28 days when rubber is adhesively bonded to various smoothing compounds (example 1 and comparative examples Comp. 1 and Comp. 4) four hours after application.

Figure 3:
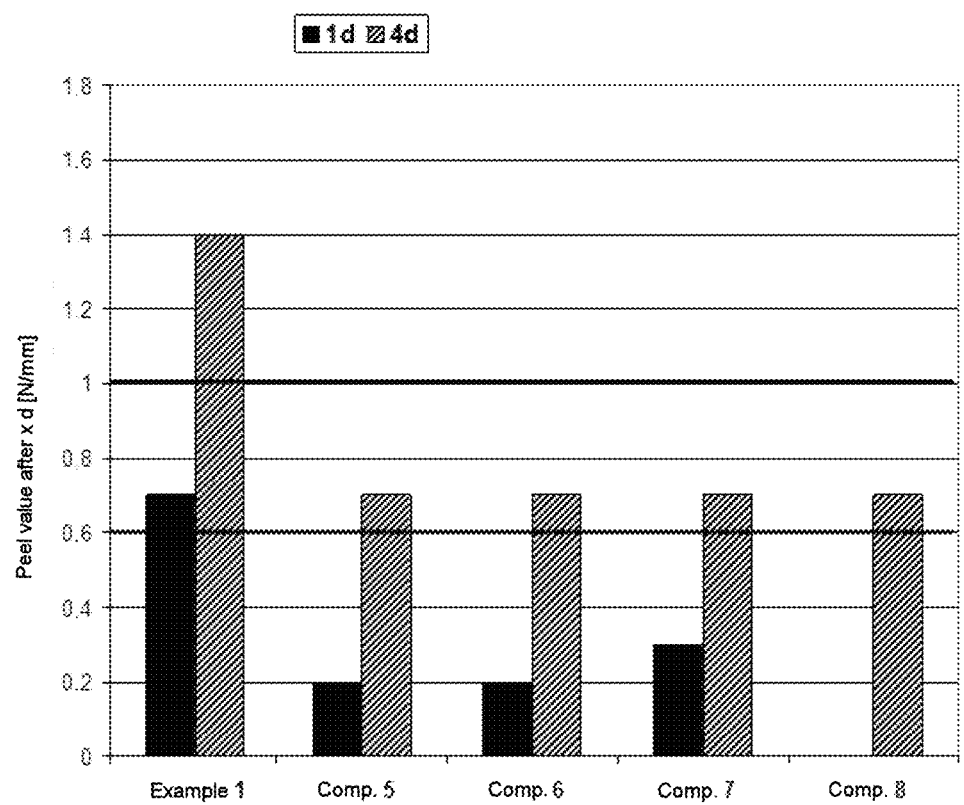

FIG. 3 shows peels values after 1 and 4 days when PVC is adhesively bonded to various smoothing compounds (example 1 and comparative examples Comp. 5 to Comp. 8) four hours after application.

Figure 4:
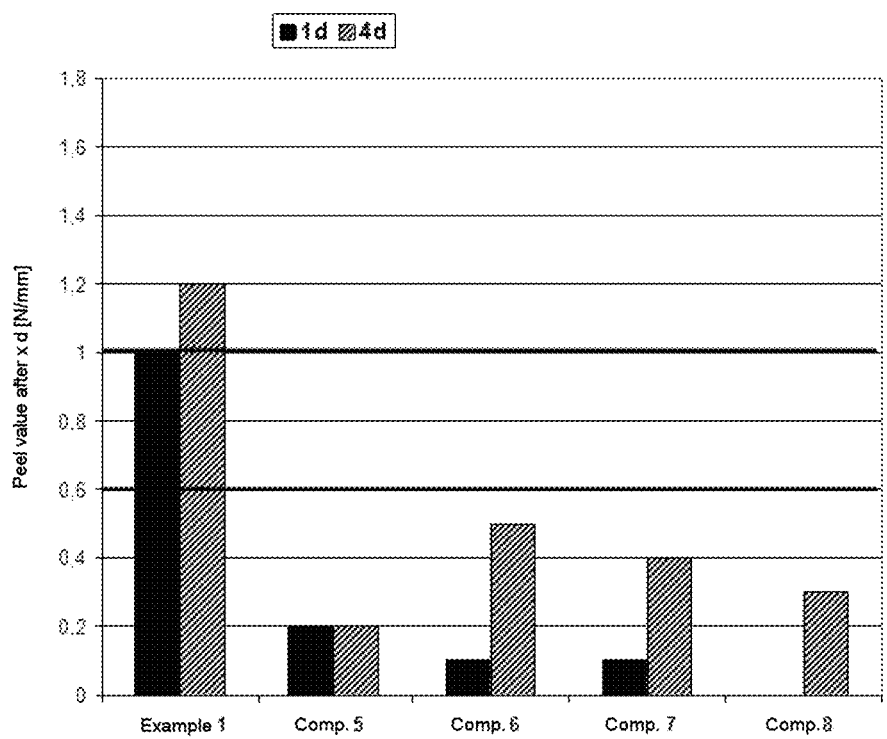

FIG. 4 shows peels values after 1 and 4 days when rubber is adhesively bonded to various smoothing compounds (example 1 and comparative examples Comp. 5 to Comp. 8) four hours after application.

EXAMPLES

1. Formulations

Formulations for smoothing/levelling compounds based on calcium sulfate are given in table 1. Example 1 according to the invention is contrasted with comparative formulations Comp. 1, Comp. 2, Comp. 3 and Comp. 4.

TABLE 1

Formulations and mixing water requirement for smoothing/levelling compound based on calcium sulfate.

| Binder system | Amount [wt. %] | | | | |
| --- | --- | --- | --- | --- | --- |
| | Example 1 | Comp. 1 | Comp. 2 | Comp. 3 | Comp. 4 |
| Calcium sulfate hemihydrate | 46 | 50 | 50 | 46 | 46 |
| CSA cement | 7 | | | | 10 |
| OPC | 1 | | | 10 | |
| Sand | 15 | 17 | 17 | 18 | 18 |
| Limestone powder | 28.5 | 30.5 | 30.5 | 23.5 | 23.5 |
| Retarder | 0.15 | | | 0.15 | 0.15 |
| Dispersion powder | 1.5 | 1.5 | 1.5 | 1.5 | 1.5 |
| Other constituents[1] | 0.85 | 1.0 | 1.0 | 0.85 | 0.85 |
| Mixing water requirement [%] based on powder weight | 19 | 24 | 19 | 19 | 19 |

[1]Additives: Liquefier, thickener

OPC stands for "ordinary Portland cement". CS10 from the company Belith was used as the CSA cement. The sand had an average particle size of from 0.01 to 10 mm and a quartz content of more than 99%. Limestone powder is to be understood to mean natural, pulverised calcium carbonate having a particle size of less than 500 µm. An ethylene-vinyl acetate copolymer having an MFFT of 4° C. was used as the dispersion powder. Tartaric acid was used as the retarder.

2. Assessing the Readiness for Covering

The readiness for covering of a subfloor corresponds to the period between application of the levelling/smoothing compound and the time from which functional adhesive bonding of floor coverings is possible. In general, peel values of greater than 0.6 N/mm after 24 hours are required for functional, defect-free adhesive bonding. These values should also increase continuously and preferably be at least 1 N/mm (after approximately 4-7 days).

In order to assess the readiness for covering, the smoothing/levelling compounds were applied to a layer thickness of 2.5 mm. A dry concrete subfloor pretreated with a sealing one-component rapid primer (UZIN PE 414 Turbo) and a dispersion-based adhesion promoter (Uzin PE 280) was selected as the subfloor.

The adhesive bonding of vapour-tight floor coverings took place four hours after the smoothing/levelling compound was applied. A dispersion-based universal adhesive (UZIN KE 2000 S) was used to adhesively bond PVC (Armstrong DLW Royal). Rubber coverings (Nora Noraplan Mega) were adhesively bonded using a wet-bed dispersion adhesive (e.g. UZIN KE 66). Subsequently, at various times after the adhesive bonding, strips (width: 5 cm) were peeled off the subfloor using a spring balance, and thus the peel values (in N/mm) were determined.

When a PVC covering was adhesively bonded to a conventional smoothing/levelling compound based on calcium sulfate (Comp. 1) four hours after application, a maximum peel value of approximately only 0.4 N/mm (cf. FIG. 1) was displayed even 28 days after adhesive bonding. This value is not sufficient for lasting functional adhesive bonding. The extremely low peel values 24 hours or seven days after adhesive bonding gave a further indication that a product of this kind is not ready for covering four hours after application. This is even more considerable when rubber coverings are adhesively bonded (cf. FIG. 2). In this case, barely measurable peel values (<0.4 N/mm) were reached even after 28 days.

Comparative example Comp. 2 differs from the conventional smoothing/levelling compound based on calcium sulfate Comp. 1 on account of a reduced mixing water requirement. This accelerated the drying process. This was apparent from the slightly higher peel values after adhesive bonding of PVC. The peel values of greater than 0.6 N/mm after 24 hours required for functional, defect-free adhesive bonding were not reached for the comparative example.

Comparative examples Comp. 3 and Comp. 4 demonstrate that it was only possible to achieve a readiness for covering of four hours after application by using the binder system (example 1) according to the invention. The addition of Portland cement (Comp. 3) and the associated increase in pH in the system did not result in any significant improvement in the peel values (FIG. 1). On account of the inadequate concentration of $Al^{3+}$ or $Al(OH)_3$, it was not possible for enough ettringite to be formed in order to bind surplus water.

The combination of a calcium sulfate binder with calcium sulfoaluminate cement (Comp. 4), in the absence of Portland cement, resulted no more so in readiness for covering after four hours.

The smoothing compound according to the invention (example 1) displayed significantly higher peel values (FIGS. 1 and 2) than the comparative example products both when PVC was adhesively bonded and when rubber was adhesively bonded. By combining calcium sulfate hemihydrate with calcium sulfoaluminate cement and Portland cement in order to set the pH 9, it was possible to achieve faster drying of the smoothing compound. It was possible to bind almost all surplus water in the ettringite crystals that form and it was not necessary to discharge said water to the environment. This quickly reduced the residual moisture in the smoothing compound, and therefore water that was introduced by the adhesive could be compensated for.

This made functional adhesive bonding possible as early as four hours after application of the smoothing compound. Sufficiently high peel values were reached as early as 24 hours after adhesive bonding, and said values increased further with time. Peel values of >1 N/mm were reached as early as approximately four days after the adhesive bonding both when PVC was adhesively bonded and when rubber was adhesively bonded.

In a further experiment, the formulation of example 1 and further comparative formulations were produced and tested according to the above-described methods. The above-described PVC and rubber coverings were used as the floor covering. The comparative formulations represent the binder compositions described in WO 2014/108435 and WO 2014/108436. The compositions of the tested formulations are collated in table 2; the results are shown graphically in FIGS. 3 and 4.

TABLE 2

| Component | Example 1 | Comp. 5 | Comp. 6 | Comp. 7 | Comp. 8 |
|---|---|---|---|---|---|
| | Amount [wt. %] | | | | |
| Calcium sulfate hemihydrate | 46 | 40 | 40 | 40 | 35.5 |
| CSA cement | 7 | | | | |
| High-alumina cement | | 5 | 5 | 5 | 3.5 |
| OPC | 1 | 8 | 8 | 8 | 6.5 |
| Metakaolin | | 5 | | 2.5 | 2.25 |
| Zeolite | | | 5 | 2.5 | 2.25 |
| Sand | 15 | 19.15 | 19.15 | 19.15 | 49.95 |
| Limestone powder | 28.5 | 20 | 20 | 20 | |
| Retarder | 0.15 | 0.05 | 0.05 | 0.05 | |
| Dispersion powder | 1.5 | 2.5 | 2.5 | 2.5 | |
| Other constituents[1] | 0.85 | 0.3 | 0.3 | 0.3 | 0.05 |
| Mixing water requirement [%] based on powder weight | 19 | 20 | 20 | 20 | 25 |

[1]Additives: Liquefier, thickener

It can be seen from FIGS. 3 and 4 that, when the formulation according to the invention is used, readiness for covering (peel value 0.6 N/mm²) is reached after one day both when PVC floor coverings are adhesively bonded and when rubber floor coverings are adhesively bonded. However, when the formulations according to the prior art are used, readiness for covering is only reached after four days when PVC coverings are adhesively bonded, and is not reached, even after four days, when rubber coverings are adhesively bonded.

The invention claimed is:
1. A construction chemical formulation, comprising
   a) from 40 to 55 wt. % of at least one binder based on calcium sulfate, which is selected from the group consisting of calcium sulfate α-hemihydrate, calcium sulfate β-hemihydrate, calcium sulfate anhydrite, calcium sulfate dihydrate and mixtures thereof;
   b) from 3 to 10 wt. % of at least one ettringite former, which is selected from the group consisting of calcium sulfoaluminate cement, sodium aluminate, high-alumina cement, aluminum sulfate and mixtures thereof;
   c) from 0.1 to 2 wt. % of at least one activator, which is selected form the group consisting of Portland cement, calcium hydroxide, sodium hydroxide, potassium hydroxide, alkali water glasses and mixtures thereof, wherein the pH is set from 9 to 14 in the construction chemical formulation;

d) from 8 to 60 wt. % of at least one filler; and e) from 0.1 to 10 wt. % of at least one redispersible dispersion powder, which is selected from the group consisting of polymers and copolymers of vinyl esters of $C_1$-$C_{15}$ alkyl carboxylic acids, copolymers of vinyl esters of $C_1$-$C_{15}$ alkyl carboxylic acids with olefins or dienes or vinyl halides, and copolymers of ester of (meth)acrylic acid with $C_1$-$C_{12}$ alkanols with styrene;

in each case based on the total weight of the construction chemical formulation.

2. The construction chemical formulation according to claim 1, comprising from 46 to 50 wt. % of the binder based on calcium sulfate.

3. The construction chemical formulation according to claim 1, comprising from 41 to 55 wt. % of the binder based on calcium sulfate.

4. The construction chemical formulation according to claim 1, wherein the ettringite former is selected from the group consisting of calcium sulfoaluminate cement, high-alumina cement and mixtures thereof.

5. The construction chemical formulation according to claim 1, comprising 7 wt. % of the ettringite former.

6. The construction chemical formulation according to claim 1, comprising from 3 to 8 wt. % of the ettringite former.

7. A construction chemical formulation, comprising a) from 40 to 55 wt. % of at least one binder based on calcium sulfate, which is selected from the group consisting of calcium sulfate α-hemihydrate, calcium sulfate β-hemihydrate, calcium sulfate anhydrite, calcium sulfate dihydrate and mixtures thereof;

b) from 3 to 10 wt. % of at least one ettringite former, which is selected from the group consisting of calcium sulfoaluminate cement, sodium aluminate, high-alumina cement, aluminum sulfate and mixtures thereof;

c) from 0.1 to 2 wt. % of at least one activator, which is selected form the group consisting of Portland cement, calcium hydroxide, sodium hydroxide, potassium hydroxide, alkali water glasses and mixtures thereof, wherein the pH is set from 9 to 14 in the construction chemical formulation;

d) from 8 to 60 wt. % of at least one filler; and e) from 0.1 to 10 wt. % of at least one redispersible dispersion powder, which is selected from the group consisting of polymers and copolymers of vinyl esters of $C_1$-$C_{15}$ alkyl carboxylic acids, copolymers of vinyl esters of $C_1$-$C_{15}$ alkyl carboxylic acids with olefins or dienes or vinyl halides, and copolymers of ester of (meth)acrylic acid with $C_1$-$C_{12}$ alkanols with styrene;

in each case based on the total weight of the construction chemical formulation, and wherein the amounts of calcium sulfate binder and ettringite former in the total construction chemical formulation is from 43 to 60 wt. %.

8. The construction chemical formulation according to claim 1, wherein the activator is selected from the group consisting of Portland cement, calcium hydroxide and mixtures thereof.

9. The construction chemical formulation according to claim 1, comprising 1 wt. % of the activator.

10. The construction chemical formulation according to claim 1, additionally containing from 0.01 to 7 wt. % of at least one additive, based on the total weight of the construction chemical formulation.

11. The construction chemical formulation according to claim 10, wherein the at least one additive is selected from the group consisting of liquefiers, setting retarders, setting accelerators, thickeners, stabilizers, plastic fibers, dispersants, wetting agents, anti-foaming agents, air-entraining agents and mixtures thereof.

12. The construction chemical formulation according to claim 1, comprising from 0.5 to 10 wt. % of the redispersible dispersion powder.

13. The construction chemical formulation according to claim 1, comprising from 35 to 55 wt. % of the filler.

14. The construction chemical formulation according to claim 1, wherein the filler is selected from the group consisting of silica sands, limestone, limestone powders, dolomite, talc, mica, expanded glass granulates, and expanded clays.

15. The construction chemical formulation according to claim 1, which is substantially free of metakaolin, zeolite or a mixture thereof.

16. A product selected from the group consisting of thin-layer levelling compounds, self-levelling and stable smoothing compounds, screed binders, screed mortars, tile adhesive mortars, grouts and sealing slurries, comprising the construction chemical formulation according to claim 1.

17. A method of levelling or smoothing a floor or subfloor comprising applying to the floor or subfloor the construction chemical formulation according to claim 1.

18. The construction chemical formulation according to claim 1, wherein the pH is set from 11 to 14 in the construction chemical formulation.

* * * * *